US011634625B2

(12) United States Patent
Penny et al.

(10) Patent No.: US 11,634,625 B2
(45) Date of Patent: *Apr. 25, 2023

(54) SILOXANE SURFACTANT ADDITIVES FOR OIL AND GAS APPLICATIONS

(71) Applicant: Flotek Chemistry, LLC, Houston, TX (US)

(72) Inventors: Glenn S. Penny, Houston, TX (US); Keith Ingram Dismuke, Germantown, TN (US); Richard Nelson Fox, Jersey Village, TX (US); Andrei Zelenev, Spring, TX (US); Randal M. Hill, Honor, MI (US)

(73) Assignee: Flotek Chemistry, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,473

(22) Filed: Mar. 13, 2020

(65) Prior Publication Data
US 2020/0216749 A1 Jul. 9, 2020

Related U.S. Application Data

(63) Continuation of application No. 14/445,006, filed on Jul. 28, 2014, now Pat. No. 10,590,332, which is a continuation-in-part of application No. 13/831,410, filed on Mar. 14, 2013, now abandoned.

(51) Int. Cl.
C09K 8/68 (2006.01)
C09K 8/60 (2006.01)
C09K 8/88 (2006.01)
C09K 8/72 (2006.01)
C09K 8/86 (2006.01)
E21B 43/26 (2006.01)
E21B 43/267 (2006.01)

(52) U.S. Cl.
CPC ............. C09K 8/604 (2013.01); C09K 8/68 (2013.01); C09K 8/72 (2013.01); C09K 8/86 (2013.01); C09K 8/885 (2013.01); E21B 43/26 (2013.01); E21B 43/267 (2013.01); C09K 2208/28 (2013.01)

(58) Field of Classification Search
CPC . C09K 8/604; C09K 8/72; C09K 8/86; C09K 8/68; C09K 8/885; C09K 2208/28; E21B 43/26; E21B 43/267
See application file for complete search history.

(56) References Cited

U.S. PATENT DOCUMENTS

| | | |
|---|---|---|
| 3,060,210 A | 4/1961 | De Groote |
| 3,047,062 A | 7/1962 | Meadors |
| 3,299,112 A | 1/1967 | Bailey |
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,669,544 A | 6/1987 | Nimerick |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |

(Continued)

FOREIGN PATENT DOCUMENTS

| | | |
|---|---|---|
| CA | 2595025 | 9/2006 |
| CN | 102127414 A | 7/2011 |

(Continued)

OTHER PUBLICATIONS

U.S. Appl. No. 15/146,278, filed May 4, 2016, Penny et al.
U.S. Appl. No. 15/999,693, filed Aug. 20, 2018, Saboowala et al.
Extended European Search Report for EP 14774954.3 dated Oct. 19, 2016.
International Search Report and Written Opinion dated May 13, 2014 for Application No. PCT/US2014/014271.
[No Author Listed], Scifinder Structure of Silwet L-77 dated Apr. 6, 2015.
[No Author Listed], Silwet L-77 Surfactant information sheet. Helena Chemical Company. 1998. Retrieved from the internet Apr. 15, 2014.

(Continued)

Primary Examiner — Kumar R Bhushan
(74) Attorney, Agent, or Firm — Wolf, Greenfield & Sacks, P.C.

(57) ABSTRACT

A well treatment additive includes a siloxane surfactant, a solvent and an aqueous phase. The solvent is preferably a terpene hydrocarbon. Also disclosed is a method for using the well treatment additive to form and enhance the properties of terpene solvent based additives useful for the treatment of oil and gas wells. Methods of using the novel well treatment additives include using the additives in a variety of well treatment processes including, but not limited to, acidizing operations, hydraulic fracturing operations, well remediation operations and water removal operations.

11 Claims, 4 Drawing Sheets

(56) References Cited

U.S. PATENT DOCUMENTS

| | | |
|---|---|---|
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,291,405 B1 | 9/2001 | Lee et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,583,194 B2 | 6/2003 | Sendijarevic |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,122,509 B2 | 10/2006 | Sanner et al. |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,823,647 B2 | 11/2010 | Yang et al. |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 8,916,508 B2 | 12/2014 | Parnell et al. |
| 9,068,108 B2 | 6/2015 | Hill et al. |
| 9,200,192 B2 | 12/2015 | Zelenev et al. |
| 9,222,013 B1 | 12/2015 | Champagne et al. |
| 9,321,955 B2 | 4/2016 | Hill et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,790,414 B2 | 10/2017 | Champagne et al. |
| 9,809,741 B2 | 11/2017 | Hill et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 9,890,624 B2 | 2/2018 | Portwood |
| 9,890,625 B2 | 2/2018 | Portwood et al. |

(56) References Cited

U.S. PATENT DOCUMENTS

| | | | |
|---|---|---|---|
| 9,951,264 B2 | 4/2018 | Penny et al. | |
| 9,957,779 B2 | 5/2018 | Fursdon-Welsh et al. | |
| 9,994,762 B2 | 6/2018 | Hill et al. | |
| 10,000,693 B2 | 6/2018 | Hill et al. | |
| 10,005,948 B2 | 6/2018 | Champagne et al. | |
| 10,053,619 B2 | 8/2018 | Saboowala et al. | |
| 10,081,760 B2 | 9/2018 | Ngantung et al. | |
| 10,087,361 B2 | 10/2018 | Hill et al. | |
| 10,144,862 B2 | 12/2018 | Zelenev et al. | |
| 10,196,557 B2 | 2/2019 | Hill et al. | |
| 10,280,360 B2 | 5/2019 | Champagne et al. | |
| 10,287,483 B2 | 5/2019 | Saboowala et al. | |
| 10,294,757 B2 | 5/2019 | Fursdon-Welsh et al. | |
| 10,294,764 B2 | 5/2019 | Champagne et al. | |
| 10,308,859 B2 | 6/2019 | Champagne et al. | |
| 10,421,707 B2 | 9/2019 | Trabelsi et al. | |
| 10,544,355 B2 | 1/2020 | Hill et al. | |
| 10,577,531 B2 | 3/2020 | Pursley et al. | |
| 10,590,332 B2 | 3/2020 | Penny et al. | |
| 10,696,887 B2 | 6/2020 | Dismuke et al. | |
| 10,703,960 B2 | 7/2020 | Hill et al. | |
| 10,717,919 B2 | 7/2020 | Germack et al. | |
| 10,731,071 B2 | 8/2020 | Saboowala et al. | |
| 10,738,235 B2 | 8/2020 | Hill et al. | |
| 10,934,472 B2 | 3/2021 | Smith, Jr. | |
| 10,941,106 B2 | 3/2021 | Trabelsi et al. | |
| 11,149,189 B2 | 10/2021 | Penny et al. | |
| 2001/0007663 A1 | 7/2001 | Von Corswant | |
| 2003/0022944 A1 | 1/2003 | Gumkowski et al. | |
| 2003/0069143 A1 | 4/2003 | Collins | |
| 2003/0092581 A1 | 5/2003 | Crews | |
| 2003/0166472 A1 | 9/2003 | Pursley et al. | |
| 2003/0232095 A1 | 12/2003 | Garti et al. | |
| 2006/0014648 A1 | 1/2006 | Milson et al. | |
| 2006/0211593 A1 | 9/2006 | Smith et al. | |
| 2006/0223715 A1* | 10/2006 | Svoboda | E21B 37/00 507/265 |
| 2006/0258541 A1 | 11/2006 | Crews | |
| 2007/0123445 A1 | 5/2007 | Tuzi et al. | |
| 2007/0125716 A1* | 6/2007 | Procter | E21B 21/068 210/708 |
| 2007/0249502 A1 | 10/2007 | Procter et al. | |
| 2007/0293404 A1 | 12/2007 | Hutchins et al. | |
| 2007/0295368 A1 | 12/2007 | Harrison et al. | |
| 2008/0255247 A1* | 10/2008 | Sagalowicz | A23L 33/12 514/772 |
| 2008/0274918 A1 | 11/2008 | Quintero et al. | |
| 2008/0287324 A1 | 11/2008 | Pursley et al. | |
| 2009/0078415 A1 | 3/2009 | Fan et al. | |
| 2009/0088488 A1 | 4/2009 | Bruckner et al. | |
| 2009/0137432 A1 | 5/2009 | Sullivan et al. | |
| 2009/0159288 A1 | 6/2009 | Horvath Szabo et al. | |
| 2009/0200027 A1* | 8/2009 | Kakadjian | C09K 8/68 166/270.1 |
| 2009/0221456 A1 | 9/2009 | Harrison et al. | |
| 2009/0260819 A1 | 10/2009 | Kurian et al. | |
| 2009/0275488 A1 | 11/2009 | Zamora et al. | |
| 2009/0281004 A1 | 11/2009 | Ali et al. | |
| 2010/0022421 A1 | 1/2010 | Gutierrez et al. | |
| 2010/0173805 A1 | 7/2010 | Pomerleau | |
| 2010/0216670 A1 | 8/2010 | Del Gaudio et al. | |
| 2010/0243248 A1 | 9/2010 | Golomb et al. | |
| 2010/0252267 A1 | 10/2010 | Harris et al. | |
| 2010/0263863 A1 | 10/2010 | Quintero et al. | |
| 2010/0272765 A1 | 10/2010 | Ho et al. | |
| 2010/0307757 A1 | 12/2010 | Blow et al. | |
| 2011/0021386 A1 | 1/2011 | Ali et al. | |
| 2011/0136706 A1 | 6/2011 | Carroll et al. | |
| 2011/0146983 A1 | 6/2011 | Sawdon | |
| 2011/0190174 A1 | 8/2011 | Weerasooriya et al. | |
| 2011/0220353 A1 | 9/2011 | Bittner et al. | |
| 2011/0237467 A1 | 9/2011 | Cornette et al. | |
| 2011/0253365 A1 | 10/2011 | Crews et al. | |
| 2011/0290491 A1 | 12/2011 | Gupta et al. | |
| 2012/0004146 A1 | 1/2012 | Van Zanten et al. | |
| 2012/0015852 A1 | 1/2012 | Quintero et al. | |
| 2012/0071366 A1 | 3/2012 | Falana et al. | |
| 2012/0080232 A1 | 4/2012 | Muller et al. | |
| 2012/0129738 A1 | 5/2012 | Gupta et al. | |
| 2012/0149626 A1 | 6/2012 | Fluck et al. | |
| 2012/0168165 A1 | 7/2012 | Holcomb et al. | |
| 2012/0181019 A1 | 7/2012 | Saini et al. | |
| 2012/0193095 A1 | 8/2012 | Varadaraj et al. | |
| 2012/0208726 A1 | 8/2012 | Smith et al. | |
| 2012/0234548 A1 | 9/2012 | Dyer | |
| 2012/0241155 A1 | 9/2012 | Ali et al. | |
| 2012/0241220 A1 | 9/2012 | Quintero et al. | |
| 2012/0255887 A1 | 10/2012 | Holms et al. | |
| 2012/0261120 A1 | 10/2012 | Del Gaudio et al. | |
| 2012/0285690 A1 | 11/2012 | Weaver et al. | |
| 2012/0285694 A1 | 11/2012 | Morvan et al. | |
| 2012/0318504 A1 | 12/2012 | Fan et al. | |
| 2012/0318515 A1 | 12/2012 | Cawiezel et al. | |
| 2012/0322697 A1 | 12/2012 | Zhang | |
| 2012/0325492 A1 | 12/2012 | Fefer et al. | |
| 2013/0029883 A1 | 1/2013 | Dismuke et al. | |
| 2013/0048281 A1 | 2/2013 | Van Zanten et al. | |
| 2013/0079255 A1 | 3/2013 | Del Gaudio et al. | |
| 2013/0109597 A1 | 5/2013 | Sarkar et al. | |
| 2013/0126158 A1 | 5/2013 | Gupta et al. | |
| 2013/0133886 A1 | 5/2013 | Quintero | |
| 2013/0137611 A1 | 5/2013 | Pierce et al. | |
| 2013/0146288 A1 | 6/2013 | Smith et al. | |
| 2013/0146545 A1 | 6/2013 | Pabalan et al. | |
| 2013/0153232 A1 | 6/2013 | Bobier et al. | |
| 2013/0153234 A1 | 6/2013 | Bobier et al. | |
| 2013/0192826 A1 | 8/2013 | Kurian et al. | |
| 2013/0213659 A1 | 8/2013 | Luyster et al. | |
| 2013/0233559 A1 | 9/2013 | van Zanten et al. | |
| 2013/0244913 A1 | 9/2013 | Maberry et al. | |
| 2013/0261033 A1 | 10/2013 | Nguyen | |
| 2013/0292121 A1 | 11/2013 | Penny et al. | |
| 2014/0005079 A1 | 1/2014 | Dahanayake et al. | |
| 2014/0110344 A1 | 4/2014 | Hoag et al. | |
| 2014/0202700 A1 | 7/2014 | Blair | |
| 2014/0262274 A1 | 9/2014 | Dismuke et al. | |
| 2014/0262288 A1* | 9/2014 | Penny | C09K 8/602 166/307 |
| 2014/0274822 A1 | 9/2014 | Dismuke et al. | |
| 2014/0284053 A1 | 9/2014 | Germack | |
| 2014/0332212 A1 | 11/2014 | Ayers et al. | |
| 2014/0371115 A1 | 12/2014 | Hill et al. | |
| 2015/0053404 A1 | 2/2015 | Penny et al. | |
| 2015/0068751 A1 | 3/2015 | Saboowala et al. | |
| 2015/0105302 A1 | 4/2015 | Pursley et al. | |
| 2015/0197683 A1 | 7/2015 | Hategan et al. | |
| 2015/0247082 A1 | 9/2015 | Rea | |
| 2015/0247381 A1 | 9/2015 | Pursley | |
| 2015/0247393 A1* | 9/2015 | Portwood | C09K 8/00 166/275 |
| 2016/0017204 A1 | 1/2016 | Hill et al. | |
| 2016/0032172 A1 | 2/2016 | Pursley et al. | |
| 2016/0096989 A1 | 4/2016 | Ngantung et al. | |
| 2016/0257911 A1 | 9/2016 | Denison et al. | |
| 2016/0312106 A1 | 10/2016 | Penny et al. | |
| 2017/0275518 A1 | 9/2017 | Trabelsi et al. | |
| 2017/0313925 A1 | 11/2017 | Dismuke et al. | |
| 2017/0335179 A1 | 11/2017 | Ngantung et al. | |
| 2017/0368560 A1 | 12/2017 | McElhany et al. | |
| 2018/0134941 A1 | 5/2018 | Saboowala et al. | |
| 2018/0171213 A1 | 6/2018 | Hill et al. | |
| 2018/0282611 A1 | 10/2018 | Hill et al. | |
| 2019/0031948 A1 | 1/2019 | Hill et al. | |
| 2019/0055457 A1 | 2/2019 | Smith, Jr. et al. | |
| 2019/0055458 A1 | 2/2019 | Smith, Jr. et al. | |
| 2019/0055459 A1 | 2/2019 | Zelenev et al. | |
| 2019/0085236 A1 | 3/2019 | Saboowala et al. | |
| 2019/0090476 A1 | 3/2019 | Smith, Jr. et al. | |
| 2019/0100689 A1 | 4/2019 | Zelenev et al. | |
| 2019/0169488 A1 | 6/2019 | Hill et al. | |
| 2019/0169492 A1 | 6/2019 | Hill et al. | |
| 2019/0241796 A1 | 8/2019 | Mast et al. | |
| 2019/0264094 A1 | 8/2019 | Hill et al. | |
| 2019/0284467 A1 | 9/2019 | Forbes et al. | |

(56) References Cited

U.S. PATENT DOCUMENTS

| | | |
|---|---|---|
| 2019/0315674 A1 | 10/2019 | Trabelsi et al. |
| 2019/0316021 A1 | 10/2019 | Champagne et al. |
| 2020/0157412 A1 | 5/2020 | Hill et al. |
| 2020/0216749 A1 | 7/2020 | Penny et al. |
| 2020/0332177 A1 | 10/2020 | Hill et al. |
| 2020/0369950 A1 | 11/2020 | Hill et al. |
| 2021/0108132 A1 | 4/2021 | Trabelsi |

FOREIGN PATENT DOCUMENTS

| | | |
|---|---|---|
| CN | 102277143 B | 3/2013 |
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| EP | 14774954.3 | 10/2016 |
| WO | 1999/049182 A1 | 9/1999 |
| WO | 2005/048706 A2 | 6/2005 |
| WO | 2007/011475 A1 | 1/2007 |
| WO | 2008/141210 | 11/2008 |
| WO | 2012/003356 | 1/2012 |
| WO | 2012/158645 A1 | 11/2012 |
| WO | PCT/US2014/014271 | 5/2014 |
| WO | 2017/099709 A1 | 6/2017 |
| WO | WO 2018/111229 A1 | 6/2018 |

OTHER PUBLICATIONS

[No Author Listed], The HLB system: a time-saving guide to emulsifier selection. ICI Americas Inc. 1976. 22 pages.

ADM, Evolution Chemicals E5789-117 Description. Jun. 2014.

Brost et al., Surfactants assist water-in-oil monitoring by fluorescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, eastern green river, Wyoming. 2009 SPE Rocky Mountain Petroleum Technology Conference. Denver, Colorado, USA, Apr. 14-16, 2009. SPE-123280. 13 pages.

HAW, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kulkarni et al., Foams: Theory, Measurements, and Applications. Chapter 14: Science and Technology of Silicone Antifoams. Eds. Prud-homme, Khan. Marcel Dekker, Inc. New York, NY. 1996:555-85.

Kunieda et al. Evaluation of hydrophile-lipophile balance (HLB) of nonionic surfactants. J Colloid and Interface Sci. Sep. 1985;107(1):107-21.

Lai et al., Foams: Theory, Measurements, and Applications. Excerpt from Chapter 8: Additives for Foams. Eds. Prud-homme, Khan. Marcel Dekker, Inc. New York, NY 1996:316-7.

Narsimhan et al., Foams: Theory, Measurements, and Applications. Excerpt from Chapter 2: Structure, Drainage, and Coalescence of Foams and Concentrated Emulsions. Eds. Prud-homme, Khan. Marcel Dekker, Inc. New York, NY 1996:100-101.

Rome et al., Silicone in the Oil and Gas Industry. Dow Corning Corporation. Sep. 2002:14 pages.

Sawicki, George C., High-Performance Antifoams for the Textile Dyeing Industry; DEFOAMING Theory and Industrial Applications. Marcel Dekker, Inc. New York, NY. 1993:193-216.

Schlumberger Oilfield Glossary. Http://www.glossary.oilfiled.sib.com/Terms/m/microemulsion.aspx downloaded on Mar. 29, 2018.

Stoebe et al. Surfactant-Enhanced Spreading. Langmuir. 1996;12(2):337-44.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

\* cited by examiner

SILOXANE SURFACTANT ADDITIVES FOR OIL AND GAS APPLICATIONS

RELATED APPLICATIONS

This application is a continuation of U.S. application Ser. No. 14/445,006, filed Jul. 28, 2014, which is a continuation-in-part of U.S. application Ser. No. 13/831,410 (now abandoned), filed Mar. 14, 2013, which are incorporated herein by reference in their entirety.

FIELD OF THE INVENTION

The present invention generally relates to the production of petroleum and more particularly to compositions and processes for improving the recovery of petroleum from a subterranean geological formation.

BACKGROUND OF THE INVENTION

For many years, petroleum has been recovered from subterranean reservoirs through the use of drilled wells and production equipment. During the production of desirable hydrocarbons, such as crude oil and natural gas, a number of other naturally occurring substances may also be encountered within the subterranean environment.

The removal of unwanted deposits from the wellbore and production equipment is generally referred to as "remediation." In contrast, the term "stimulation" generally refers to the treatment of geological formations to improve the recovery of hydrocarbons. Common stimulation techniques include well fracturing and acidizing operations. Well remediation and stimulation are important services that are offered through a variety of techniques by a large number of companies.

Oil and natural gas are found in, and produced from, porous and permeable subterranean formations. The porosity and permeability of the formation determine its ability to store hydrocarbons, and the facility with which the hydrocarbons can be extracted from the formation.

The use of certain microemulsion additives during completion of both oil and gas wells leads to higher near wellbore permeability and long-term increased production of hydrocarbons from the well. The increased displacement of water from the formation and proppant by both oil and gas (flowback) and consequent increased production of hydrocarbons have been attributed to lowered capillary pressure. However, the solvent—hydrocarbon surfactant systems that have been used have limitations in their ability to lower capillary pressure. There is, therefore, a need for treatment compositions that are capable of lowering capillary pressure and increasing wettability while maintaining the desirable properties of conventional emulsified treatment formulations.

SUMMARY OF THE INVENTION

In preferred embodiments, the present invention includes a well treatment additive that includes a siloxane surfactant, a solvent and an aqueous phase. The solvent is preferably a terpene hydrocarbon. The well treatment additive preferably is a spontaneously formed nanofluid with a nano-sized self-assembled liquid phase.

In another aspect, the preferred embodiments include the use of siloxane surfactants (alone or in combination with conventional hydrocarbon surfactants) to form and enhance the properties of terpene solvent based nanofluid additives useful for the treatment of oil and gas wells.

In another aspect, the preferred embodiments include methods of using the novel well treatment additives in a variety of well treatment processes. Suitable well treatment processes include, but are not limited to, acidizing operations, hydraulic fracturing operations, well remediation operations and water removal operations.

DETAILED DESCRIPTION OF PREFERRED EMBODIMENTS

Figure 1:
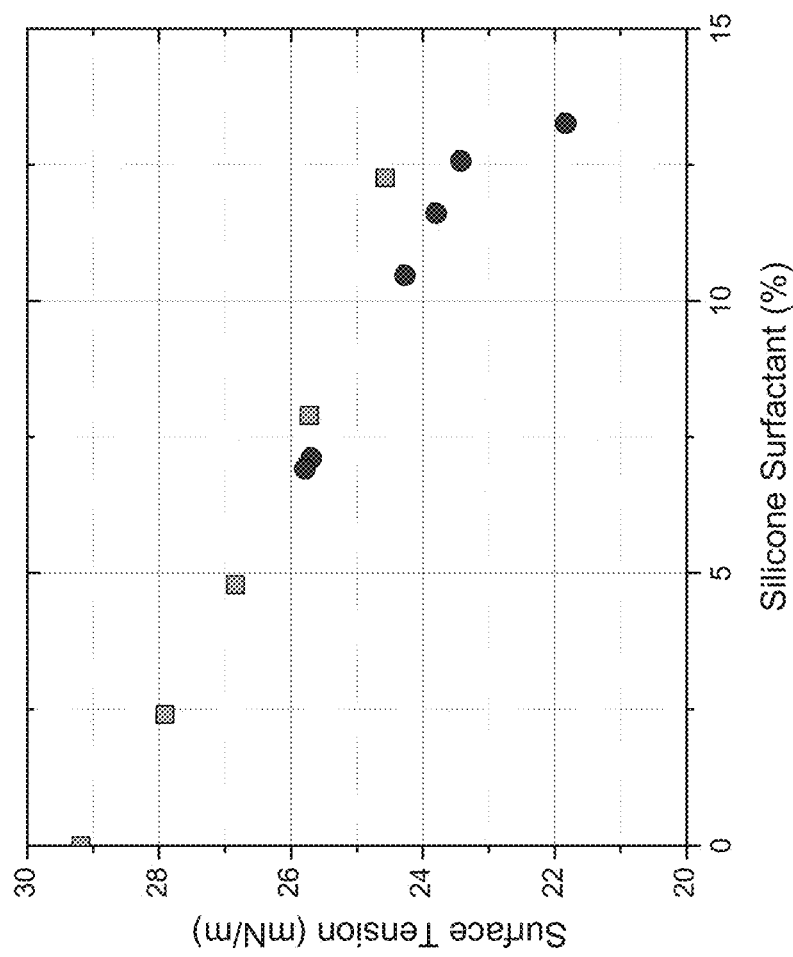
FIG. 1 provides a graph of the surface tension of 2 gpt dispersions of siloxane surfactant containing microemulsion formulations. The squares represent formulations containing a higher level of terpene solvent while the circles represent formulations with a lower level of terpene solvent.

Presently preferred embodiments generally contemplate the preparation of an additive for use in oil and gas wells. The additive preferably includes a solvent component, a surfactant component and an aqueous phase. In a particularly preferred embodiment, nano-sized particles of the solvent component are distributed within the aqueous phase. Other functional materials may also be included advantageously.

Generally, the additive is prepared using a siloxane surfactant, a solvent and an aqueous phase. In more particularly preferred embodiments, the solvent is a terpene and the surfactant includes a combination of a siloxane surfactant and a hydrocarbon surfactant of a kind, amount and proportion effective to form a stable distribution of the nano-sized particles of terpene solvent within the aqueous phase. Each of these components is discussed separately below.

As used herein, the term "siloxane surfactant" refers to permethylated siloxane materials functionalized with a sufficient number of polar groups so as to render them usefully surface active in aqueous mixtures. Thus, these siloxane surfactants qualify as amphiphiles in which a hydrophobic silicone group is coupled with one or more hydrophilic groups. They may be co-polymers, or molecules comparable in molecular weight to conventional organic surfactants such as heptaethylene glycol monododecyl ether.

To facilitate description of preferred siloxane surfactants, it is helpful to use the MDTQ notation for siloxane copolymers adopted in U.S. Pat. No. 3,299,112 issued Jan. 17, 1967 to Bailey, and summarize in Table 1 below:

TABLE 1

| MDTQ Notation for Siloxane Building Block Units | | |
|---|---|---|
| M | $Me_3SiO_{1/2}-$ | A trimethyl end-cap unit |
| D | $-Me_2SiO-$ | The basic dimethyl unit |
| T | $-MeSiO_{3/2}-$ | A three-way branch point unit |

TABLE 1-continued

MDTQ Notation for Siloxane Building Block Units

| | | |
|---|---|---|
| Q | —SiO$_2$— | A four-way branch point unit |
| M' | Me$_2$(R)SiO$_{1/2}$— | A substituted trifunctional end-cap unit |
| D' | —Me(R)SiO— | A substituted difunctional unit |
| T' | —RSiO$_{3/2}$— | A substituted three-way branch point unit |
| Me | —CH$_3$ | |
| R | | H or (after hydrosilylation) some non-methyl organic group such as —CH$_2$CH$_2$CH$_2$(OCH$_2$CH$_2$)$_n$OH |

It should be noted that while an organic radical, R, is implicit in the M'D'T' notation, the R group is shown in the structures given below to permit a more detailed disclosure of the range of structures of R groups useful within the siloxane surfactant component.

In presently preferred embodiments, the siloxane surfactant component is an organosilicon compound having a formula selected from the group consisting of one of the formulas identified in Table 2 below:

| | |
|---|---|
| 1. MD$_a$(D'R$^1$)$_b$M | a graft-type copolymer |
| 2. (M'R$^1$)D$_a$(M'R$^1$) | an ABA-type copolymer |
| 3. (M'R$^1$)D$_a$(M'R$^2$) | an AB-type copolymer |
| 4. (M'R$^1$)D$_a$(D'R$^1$)$_b$(M'R$^1$) | a hybrid graft-type, ABA-type copolymer |
| 5. T$_z$(T'R1)$_c$ | a silsesquioxane cage structure |
| 6. (M'R$^1$)$_u$M$_u$Q$_v$ | a functionalized MQ silicone resin |
| 7. [(D'R$^1$)D$_k$] | a cyclic siloxane (the square brackets denote a cyclic structure) | where R$^1$ represents an organic radical comprising —(CH$_2$)$_n$—(OCH$_2$CH$_2$)$_x$—(OCH(CH$_3$)CH$_2$)$_y$—OR$^3$, in which n = 3 to about 11, x = 3 to about 30, y = 1 to about 30, and R$^3$ may be —H, —Me, or —C(O)CH$_3$.

For formula 1, a is 0-200, and b is 1-20. The case for which a=0 and b=1 represents the heptamethyltrisiloxane surfactants. Suitable examples are available from Dow Corning Corporation as Dow Corning® Q2-5211 Superwetting Agent, or from Momentive™ as Silwet L-77. For formula 2, a is 4-50. A suitable example available from Dow Corning Corporation is Dow Corning® 2-8692 Fluid. For formula 3, a is 0-25, and R$^2$ represents an alkane radical of 1-8 carbon atoms. For formula 4, a is 0-200, and b is 1-20. For formula 5, the ratio of c:z is 1:7 to 2:6, and the total molecular weight should be less than 7000 Daltons. For formula 6, the ratio of (t+u):v is from 0.4:1 to 2:1 and the ratio of t:u is from 1:4 to 1:1, and the total molecular weight should be less than 7000 Daltons. For formula 7, k is 4-5.

Suitable hydrocarbon surfactants include a multiplicity of surface active agents which are expediently classified into nonionic, anionic, cationic and amphoteric surface-active agents. An overview is cited in Ullmanns Encyklopadie der technischen Chemie [Ullmanns Encyclopedia of Industrial Chemistry], Verlag Chemie Weinheim, 4th Edition 1975, Volume 10, pp. 449-473.

In a presently preferred embodiment, the additive comprises one or more nonionic surfactants, cationic surfactants, anionic surfactants, zwitterionic surfactants, or combinations thereof. Surfactants in general are wetting agents that lower the surface tension of a liquid in which they are dissolved, allowing easier spreading and decreasing the interfacial tension between two liquids. Each surfactant has a hydrophilic head that is attracted to water molecules and a hydrophobic tail that repels water and attaches itself to hydrophobic materials such as oil and grease.

In a particularly preferred embodiment, the additive comprises a non-ionic surfactant. In this context, a nonionic surfactant has an uncharged hydrophilic head and a hydrophobic tail comprising a carbon chain. Examples of nonionic surfactants suitable for use in this disclosure include without limitation linear alcohol ethoxylates, polyoxyethylene alkylphenol ethoxylates, polyoxyethylene alcohol ethoxylates, polyoxyethylene esters of fatty acids, polyoxyethylene alkylamines, alkyl polyglucosides, ethylene oxide-propylene oxide copolymers or a combination thereof. Particularly useful nonionic surfactants may have a carbon chain length of 8-20 carbon atoms and 3-40 ethylene oxide units, up to 40 propylene oxide units, up to 2 glucose units or a combination thereof.

In a yet another preferred embodiment, the nonionic surfactant may be present in the additive in an amount of from about 5 wt. % to about 70 wt. % based on the total weight of the additive, and more preferably from about 10 wt. % to about 70 wt. %, and even more preferably from about 20 wt. % to about 40 wt. %.

In yet another preferred embodiment, the additive comprises an anionic surfactant. In this context, an anionic surfactant has a negatively charged head and a hydrophobic tail comprising a carbon chain. Examples of anionic surfactants suitable for use in this disclosure include without limitation sodium salts of fatty acids, alkyl sulphates, alkyl ethoxylate sulphates or sulfonates, or a combination thereof. Preferred anionic surfactants may have a carbon chain length of 8-20 carbon atoms.

In yet another preferred embodiment, the additive comprises a cationic surfactant. In this context, a cationic surfactant has a positively charged head and a hydrophobic tail comprising a carbon chain. Examples of cationic surfactants suitable for use in this disclosure include without limitation quaternary ammonium salts, ethoxylated quaternary ammonium salts, or a combination thereof. A preferred cationic surfactant may have a carbon chain length of 8-20 carbon atoms In yet another preferred embodiment, the additive comprises a zwitterionic surfactant. Zwitterionic surfactants are electrically neutral surfactants that carry both a formal positive and a formal negative charge on different atoms in the same molecule. Examples of zwitterionic surfactants suitable for use in this disclosure include without limitation alkyl amine oxides, alkyl betaines, alkyl amidopropyl betaine, alkyl sulfobetaines, alkyl sultaines, or combinations thereof. A particularly preferred zwitterionic surfactant may have a carbon chain length of 8-20 carbon atoms Surfactants can be described in terms of their hydrophile-lipophile balance (HLB) numbers, or silicone HLB (SHLB) numbers for siloxane surfactants, but the formulation of a microemulsion requires that the surfactant system be matched to, and optimized for the particular oil or solvent in use. It has been determined that the best procedure for selecting and optimizing a surfactant system is to map the phase behavior and select the system that gives the desired stability over a wide range of temperatures.

The solvent component is preferably selected from the class of solvents referred to as terpenes, including those derived from citrus and from pine sources. Terpene solvents are natural products, whose structures are built up from isoprene units. A dimer consisting of two isoprene units is termed a monoterpene. They can be acyclic or cyclic. The broader term "terpenoids" also covers natural and synthetic derivatives such as alcohols, aldehydes, ketones, and ethers. Particularly preferred terpenes include cyclic and acyclic monoterpenoids, including but not limited to those that are good solvents for paraffins and asphaltenes.

The additive optionally includes a co-solvent or mixture of co-solvents. Co-solvents increase the usefulness of additives, especially freeze stability. Preferred co-solvents include short chain alkyl alcohols and glycols and combinations thereof. Particularly preferred co-solvents include methanol, ethanol, isopropanol, 1,2-pentanediol, propylene glycol, and triethylene glycol and combinations thereof.

In a preferred embodiment, the co-solvent may be present in the additive in an amount of from about 5 wt. % to about 70 wt. % based on the total weight of the additive, more preferably from about 10 wt. % to about 70 wt. %, and even more preferably from about 20 wt. % to about 40 wt. %. Alternatively, the co-solvents are incorporated into the additive to provide a formulation that is clear and stable over a temperature range from −25 degrees F. to 150 degrees F.

A series of laboratory tests confirms the superior effectiveness of the additives incorporating siloxane surfactants. It has been determined that mixtures of siloxane surfactants and hydrocarbon surfactants can markedly lower surface tension to values not achievable by the hydrocarbon surfactants alone. In addition, and unexpectedly since silicone materials are usually regarded as incompatible with hydrocarbon materials, the additives of the preferred embodiments have been found to exhibit improved aqueous phase (brine) displacement by crude oil or gas.

Within these laboratory tests, a first series of additives was prepared using a siloxane surfactant, a co-solvent, aqueous phase and a terpene solvent. A second series of additives was prepared using a siloxane surfactant, a hydrocarbon surfactant, a co-solvent, an aqueous phase and a terpene solvent. The following examples provide performance characteristics for the first and second series of additives.

Example 1

A transparent low-viscosity mixture that exhibited the characteristic properties of a microemulsion was prepared using 60% by weight of a 1:1 blend of Dow Corning Xiameter® OFX-0190 Fluid (siloxane surfactant) and isopropyl alcohol (co-solvent), 30% by weight of water (aqueous phase), and 10% by weight of technical grade d-limonene (terpene solvent). This mixture was identified as a microemulsion based on the spontaneous formation with minimal mechanical energy input to form a transparent dispersion from an immiscible mixture of water and d-limonene upon addition of an appropriate amount of surfactant and co-solvent. These and other salient characteristics identifying a mixture as a spontaneously formed microemulsion are well-known to practitioners in the art.

The order of mixing of this and other compositions described in this disclosure is not critical, but for convenience during the laboratory tests, the additives were prepared using a procedure in which a mixture of the surfactant and the isopropyl alcohol was first prepared and then combined with a mixture of the technical grade d-limonene and water. With small samples in the laboratory, a few seconds of gentle mixing yielded a transparent dispersion. It will be understood by experts on liquid mixing that longer times are required in the large vessels used in full-scale commercial manufacturing.

Example 2

A transparent low-viscosity additive was prepared using 30% by weight of a 1:1 blend of Dow Corning® 5211 Superwetting Agent (siloxane surfactant) and isopropyl alcohol (co-solvent), 60% by weight of water (aqueous phase), and 10% by weight of technical grade d-limonene (terpene solvent).

Example 3

A transparent low-viscosity additive was prepared using about 61% by weight of a blend of a detergent range alcohol ethoxylate surfactant, an ethoxylated castor oil surfactant, isopropyl alcohol and glycol co-solvent, about 2% by weight of Momentive™ Silwet L-77 siloxane surfactant, 15% by weight of water, and 22% by weight of technical grade d-limonene. This is the formulation referenced as Formulation 3B below. Additional transparent low-viscosity additives were prepared increasing the siloxane surfactant up to 12% by weight of Momentive™ Silwet L-77 (and 51% by weight of the other surfactant/co-solvent components). This is the formulation designated as 4B below.

Example 4

A transparent low-viscosity additive was prepared using about 41% by weight of a blend of a detergent range alcohol ethoxylate surfactant, an ethoxylated castor oil surfactant, isopropyl alcohol and glycol co-solvent, about 12% by weight of Momentive™ Silwet L-77 siloxane surfactant, 41% by weight of water, and 6% by weight of technical grade d-limonene. Several additional formulations similar to this were prepared with varying amounts of siloxane surfactant. These are the microemulsion formulations shown in FIG. 1 with a lower level of terpene solvent.

To characterize the interfacial and performance characteristics of these additives, 2 gallons per thousand (gpt) dilutions were prepared. The surface tension of the 2 gpt dilution was measured using a properly calibrated Kruss K100 tensiometer. The surface tension results for the formulations described under Example 3 are shown in FIG. 1. As FIG. 1 demonstrates, incorporation of the siloxane surfactant into these microemulsion formulations produced a progressive decrease in the surface tension, ultimately reaching values below 22 mN/m—much lower than common hydrocarbon surfactants, which typically give surface tension values greater than 28 mN/m.

Contact angles of 2 gpt dilutions were measured on dry-polished shale core samples from the Niobrara formation. For commercially available microemulsion products, initial contact angle values for 2 gpt dilutions are around 30-40 degrees with rapid relaxation to stable values of 9-15 degrees within 30 seconds. For the formulations shown in FIG. 1, all except the 0% siloxane surfactant gave contact angles of zero degrees (hence complete wetting) after 6-20 seconds. This demonstrates the remarkable ability of the microemulsion incorporating this siloxane surfactant to produce complete wetting of mixed-wet formation rock surfaces even for small proportions of the siloxane surfactant in the formulation. Decreasing the contact angle from 9 degrees to zero degrees increases the capillary pressure slightly, but even a small decrease in the surface tension from 29 to 28 mN/m more than offsets this slight increase (assuming a 10 micron pore diameter, capillary pressure Pc=0.831 psi for a surface tension of 29 mN/m and contact angle of 9 degrees, and Pc=0.812 psi for 28 mN/m and zero degrees). Thus the combination of surface tension lowering and increased wetting would be expected to lead to an increase in near wellbore conductivity.

Figure 2:
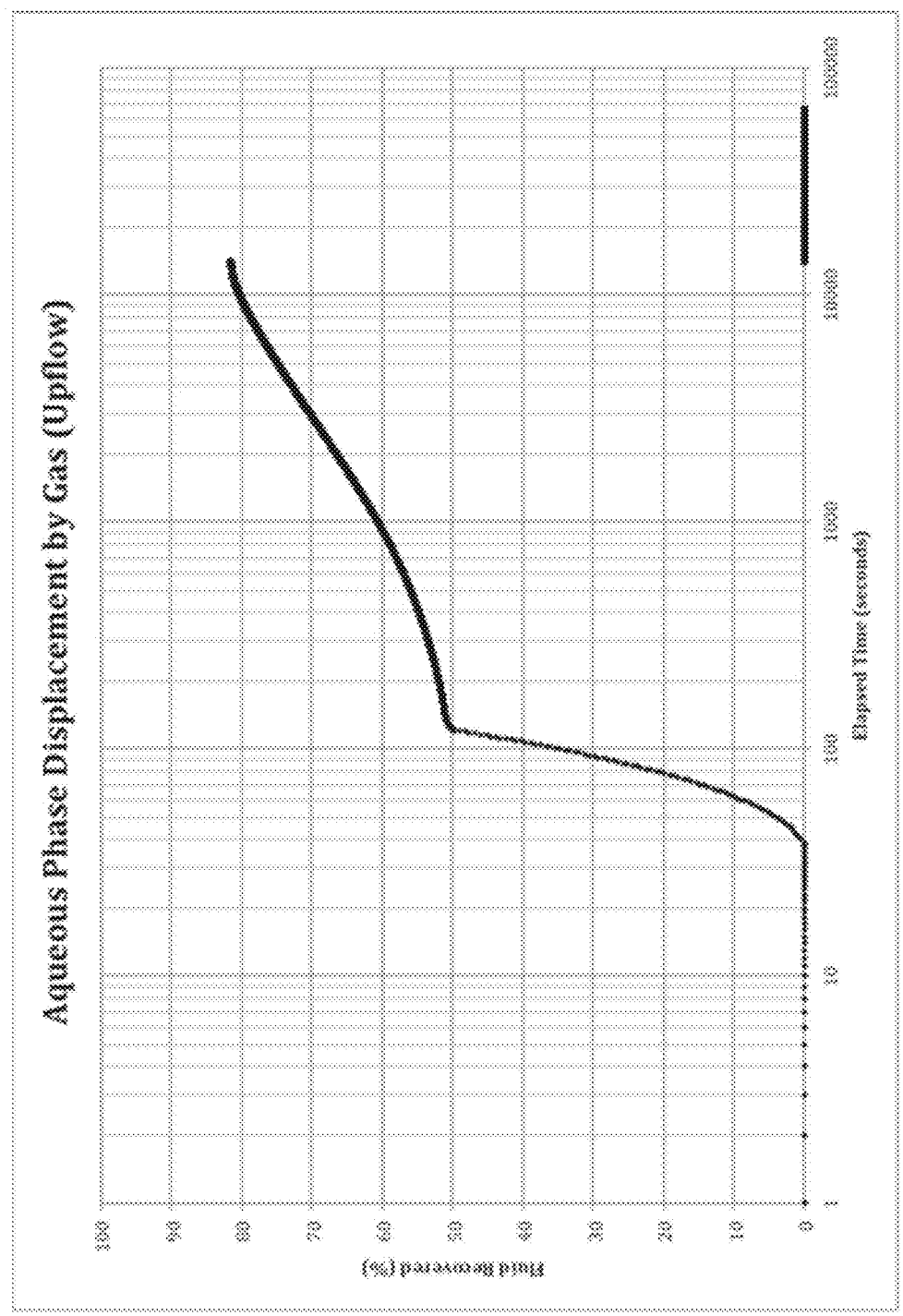
FIG. 2 provides a graph of the aqueous phase displacement by gas for a siloxane surfactant additive during an upflow experiment using 20/40 mesh Ottawa sand.

FIG. 2 shows the efficacy of one of the low terpene solvent formulations from FIG. 1 in promoting brine displacement by gas. A 2 gpt dispersion of this formulation gave a surface tension of 25.8 mN/m.

Surface tensions of the 2 gpt dispersions were measured before and after they passed through the sand pack to determine how much of the surfactant was lost to adsorption during the experiment. An increase of surface tension of 1-3 mN/m was typically observed. In the case of the formulation shown in FIG. 2 the increase was <1 mN/m. In comparison, a surfactant package widely used in the oilfield exhibited an increase in surface tension of >20 mN/m, often up to 40 mN/m (representing essentially complete loss of all surfactant due to adsorption).

Figure 3:
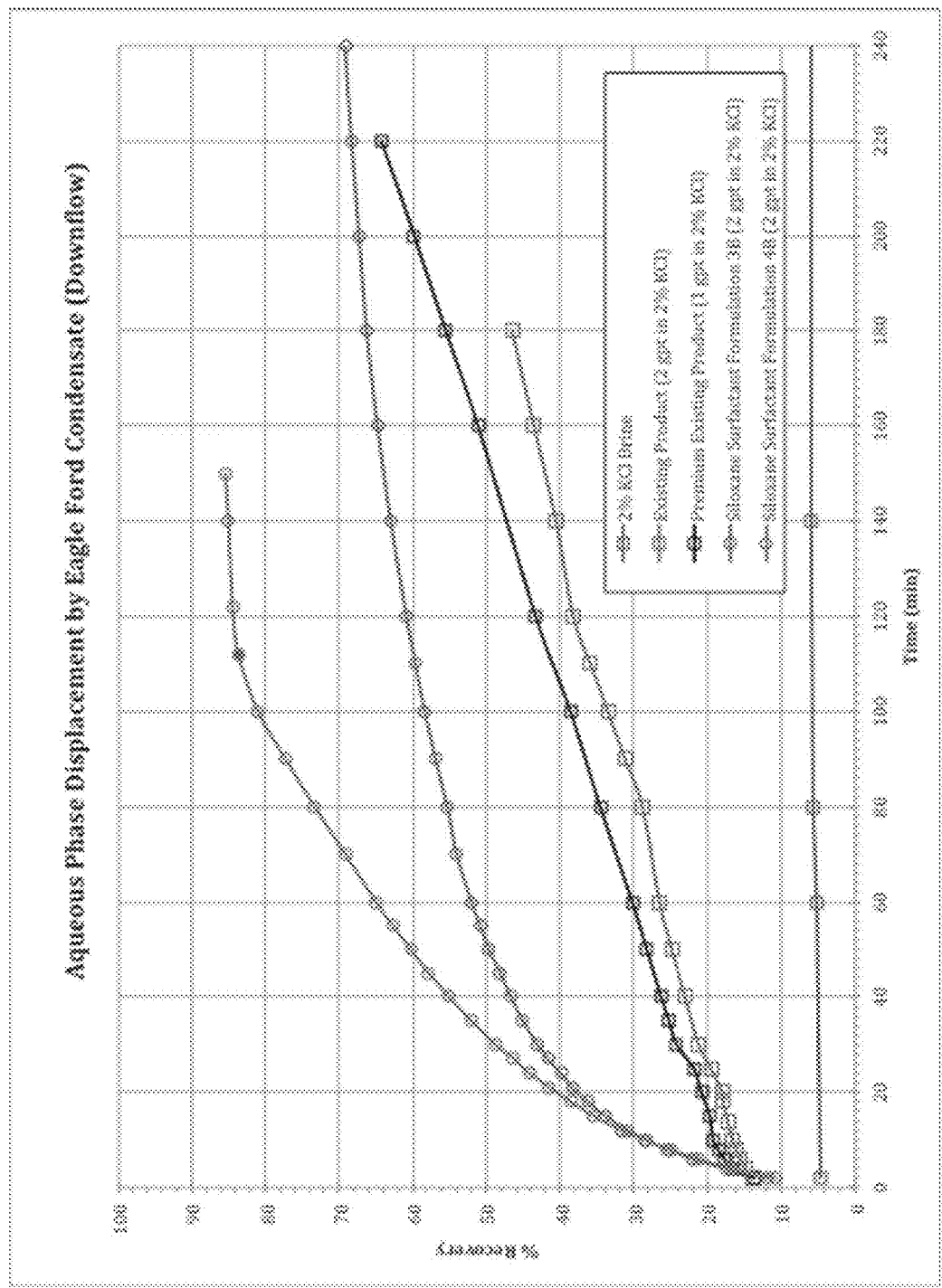
FIG. 3 provides a graph of aqueous phase displacement by Eagle Ford condensate for two siloxane surfactant microemulsion products compared with two existing commercial microemulsion products in a downflow experiment using 70/140 Ottawa Sand.

FIG. 3 shows the progression in performance enhancement from an all-hydrocarbon microemulsion formulation with increasing level of siloxane surfactant. Formulation 3B gave a surface tension of 28 mN/m, while 4B gave a surface tension value of 24.5 mN/m. Both siloxane surfactant formulations perform better than the commercial products. Thus, combining the siloxane surfactant with the hydrocarbon surfactant and the terpene solvent yields a microemulsion formulation with much improved performance.

Example 5

Figure 4:
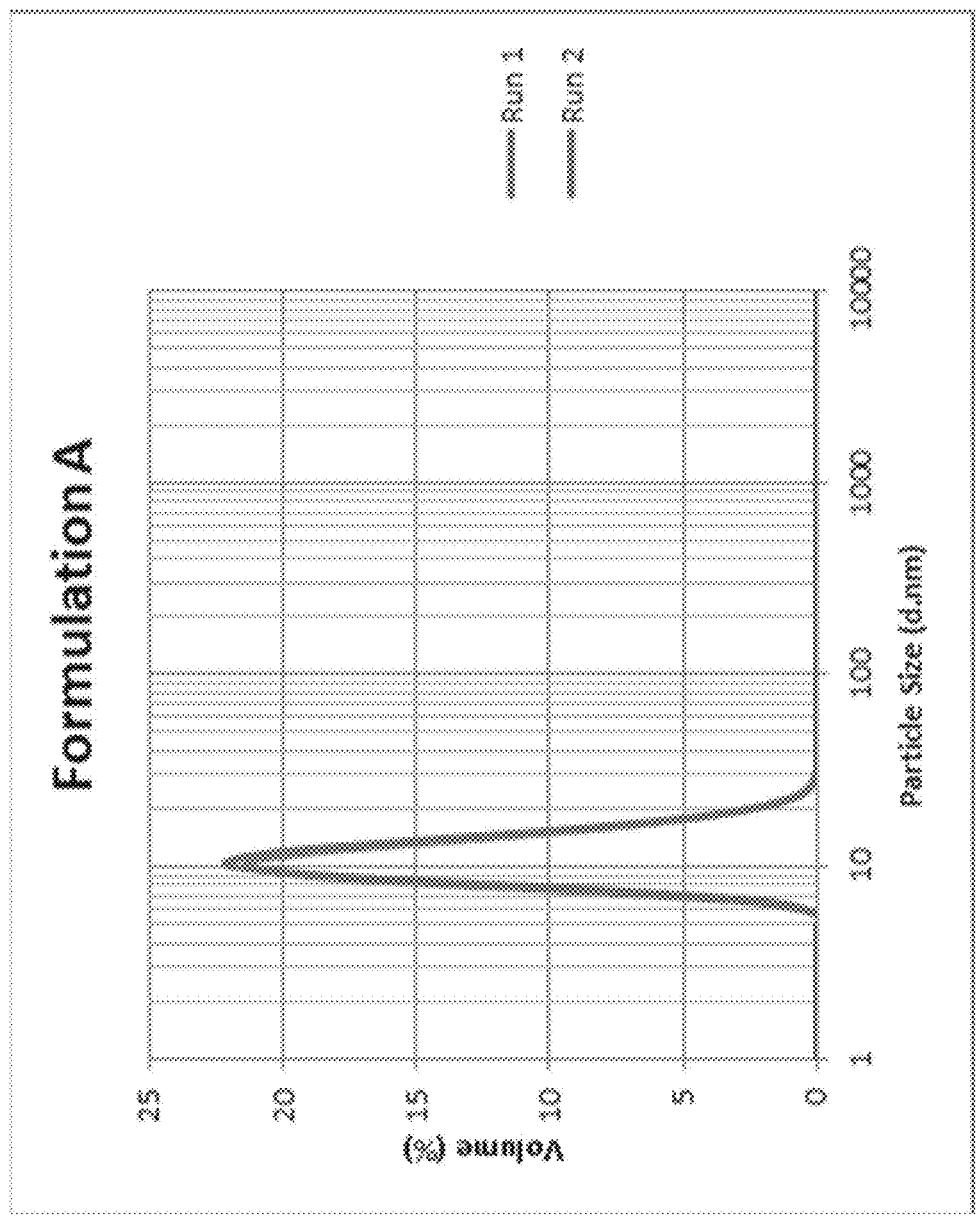
FIG. 4 provides a graph of particle size distribution for a 2 gpt dispersion of Formulation A in 2% KCl brine. The formulation disperses to a narrow single distribution of very small nanodroplets.

An additive was prepared using a combination of Dow Corning Xiameter® OFX-0190 Fluid (siloxane surfactant) with a detergent grade alcohol ethoxylate surfactant and d-limonene as the solvent, and its performance compared with that of the hydrocarbon surfactant. The ratio of the siloxane surfactant to the detergent grade alcohol ethoxylate (hydrocarbon) surfactant is 1:4 (by weight). FIG. 4 shows the particle size distribution of a 2 gpt dispersion of Formulation A into 2% KCl brine. The additive disperses to a narrow single distribution of very small nanodroplets, easily small enough to be compatible with the pore size of even low permeability tight shale gas formations. This formulation gave 87% aqueous phase displacement by condensate, and 73% aqueous phase displacement by gas (upflow).

Example 6

A further demonstration of the efficacy of a microemulsion prepared by combining a higher HLB highly efficient siloxane surfactant with a hydrocarbon surfactant and a terpene solvent. The siloxane surfactant had an HLB value of 13.2 and was combined with a detergent grade alcohol ethoxylate surfactant and d-limonene as the terpene solvent. Formulation 1 was prepared with a 1:1 ratio of water to terpene solvent, while Formulation 2 was prepared with a 6.5:1 ratio of water to terpene solvent. In both formulations, the surfactant mixture and concentration were identical. The surface tensions of both formulations before passing through the sand pack were about 21 mN/m. After contacting the sand pack the surface tensions increased 2-4 mN/m for the first pore volume, and negligible increase for the third pore volume. Both formulations reached excellent Eagle Ford condensate displacement values of about 90%—slightly better than the siloxane surfactant formulations shown in FIG. 3, and much better than the commercial microemulsion products shown in FIG. 3. These formulations achieved gas displacement values of 69-76% (see FIG. 2 for experimental details).

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the written description and appended claims.

It should be understood, that in any or all of the embodiments described herein, the well treatment additive may form an emulsion or a microemulsion. The terms emulsion and microemulsion should be understood to include emulsions or microemulsions that have a water continuous phase, or that have an oil continuous phase, or microemulsions that are bicontinuous or multiple continuous phases of water and oil.

As used herein, the term emulsion is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term microemulsion is given its ordinary meaning in the art and refers to dispersions of one immiscible liquid in another, in the form of droplets, with diameters approximately in the range of about between about 1 and about 1000 nm, or between 10 and about 1000 nanometers, or between about 10 and about 500 nm, or between about 10 and about 300 nm, or between about 10 and about 100 nm. Microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, and (vi) ease of preparation.

In some embodiments, a well treatment additive as described herein is a microemulsion, wherein the microemulsion is a stabilized microemulsion formed by the combination of a solvent-surfactant blend with an appropriate oil-based or water-based carrier fluid. Generally, a microemulsion forms upon simple mixing of the components without the need for high shearing generally required in the formation of ordinary emulsions. In some embodiments, the microemulsion is a thermodynamically stable system, and the droplets remain finely dispersed over time. In some cases, the average droplet size ranges from about 10 nm to about 300 nm.

In some embodiments, the emulsion or microemulsion is a single emulsion or microemulsion. For example, the emulsion or microemulsion comprises a single layer of a surfactant. In other embodiments, the emulsion or microemulsion may be a double or multilamellar emulsion or microemulsion. For example, the emulsion or microemulsion comprises two or more layers of a surfactant. In some embodiments, the emulsion or microemulsion comprises a single layer of surfactant surrounding a core (e.g., one or more of water, oil, solvent, and/or other additives) or a multiple layers of surfactant (e.g., two or more concentric layers surrounding the core). In certain embodiments, the emulsion or microemulsion comprises two or more immiscible cores (e.g., one or more of water, oil, solvent, and/or other additives which have equal or about equal affinities for the surfactant).

It is claimed:

1. A well treatment additive comprising:
a siloxane surfactant, wherein the siloxane surfactant has a formula selected from the group consisting of: $MD_a(D'R^1)_bM$ (formula 1) and $(M'R^1)D_a(M'R^1)$ (formula 2)
wherein "$R^1$" represents an organic radical comprising —$(CH_2)_n$—$(OCH_2CH_2)_x$—$(OCH(CH_3)CH_2)_y$—$OR^3$, in which "n" is between 3 and about 11, "x" is between 3 and about 30, "y" is between 1 and about 30, and "$R^3$" is —H;
wherein "M" represents $Me_3SiO_{1/2}$, D represents -$Me_2SiO$—, "M'$R^1$" represents $Me_2(R^1)SiO_{1/2}$—, "D'$R^1$" represents -$Me(R^1)SiO$—, and "Me" represents —$CH_3$;
wherein for formula 1, "a" is 0-200 and "b" is 1-20;
wherein for formula 2, "a" is 4-50;
a nonionic surfactant in an amount between about 5 wt % and about 70 wt % versus the total well treatment additive, wherein the nonionic surfactant is selected from the group consisting of linear alcohol ethoxylates, polyoxyethylene alkylphenol ethoxylates, polyoxyethylene alcohol ethoxylates, polyoxyethylene esters of fatty acids, polyoxyethylene alkylamines, alkyl polyglucosides, ethylene oxide—propylene oxide copolymers, and combinations thereof;
a solvent, wherein the solvent is a terpene hydrocarbon in an amount between about 5 wt % and about 40 wt % versus the total well treatment additive; and
an aqueous phase, wherein nano-sized particles of the solvent are distributed within the aqueous phase.

2. The well treatment additive of claim 1, further comprising a co-solvent.

3. The well treatment additive of claim 2, wherein the co-solvent is selected from the group consisting of alkyl alcohols containing from 1 to 4 carbon atoms, oligo-oxyalkylenes containing from 1 up to 3 units of ethylene oxide, and oligo-oxyalkylenes containing from 1 up to 3 units of propylene oxide.

4. The well treatment additive of claim 1, wherein the terpene hydrocarbon is in an amount between about 10 wt % and about 15 wt % versus the total well treatment additive.

5. The well treatment additive of claim 1, wherein the siloxane surfactant is a siloxane polyalkylene oxide copolymer.

6. The well treatment additive of claim 1, wherein the siloxane surfactant is a trisiloxane ethoxylate graft-type copolymer where a is 0.

7. The well treatment additive of claim 1, wherein the well treatment additive is transparent.

8. A method of treating a subterranean formation in a well comprising:
diluting the well treatment additive of claim 1 with a carrier fluid to a concentration of about 0.05-5 weight % of the well treatment additive to the carrier fluid to form a diluted well treatment additive;
introducing the diluted well treatment additive into the well;
allowing the diluted well treatment additive to contact the subterranean formation; and
leaving the diluted well treatment additive in the well to increase water displacement from the subterranean formation by both oil and gas.

9. The method of claim 8, wherein the diluted well treatment additive is pumped into the well in combination with a proppant during a hydraulic fracturing operation.

10. The method of claim 8, wherein the diluted well treatment additive is pumped into the well at a high rate water pack with a friction reducer.

11. The method of claim 8, wherein the diluted well treatment additive is pumped into the well in combination with a selected acid during an acidizing treatment.

* * * * *